(12) United States Patent
Miyajima et al.

(10) Patent No.: US 11,079,494 B2
(45) Date of Patent: Aug. 3, 2021

(54) POSITIONING DEVICE

(71) Applicants: DENSO CORPORATION, Kariya (JP); TOYOTA JIDOSHA KABUSHIKI KAISHA, Toyota (JP)

(72) Inventors: Akira Miyajima, Kariya (JP); Katsuhiro Matsuoka, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/730,483

(22) Filed: Dec. 30, 2019

(65) Prior Publication Data

US 2020/0150279 A1  May 14, 2020

Related U.S. Application Data

(63) Continuation of application No. PCT/JP2018/023806, filed on Jun. 22, 2018.

(30) Foreign Application Priority Data

Jul. 7, 2017 (JP) .............................. JP2017-133970

(51) Int. Cl.
  *G01S 19/23* (2010.01)
  *G01S 19/39* (2010.01)
  *G01S 19/47* (2010.01)

(52) U.S. Cl.
  CPC ............ *G01S 19/23* (2013.01); *G01S 19/393* (2019.08); *G01S 19/47* (2013.01)

(58) Field of Classification Search
  CPC ........ G01S 19/08; G01S 19/23; G01S 19/235; G01S 19/38; G01S 19/393; G01S 19/47
  See application file for complete search history.

(56) References Cited

U.S. PATENT DOCUMENTS

| | | | | |
|---|---|---|---|---|
| 5,375,059 | A * | 12/1994 | Kyrtsos | G01S 19/47 |
| | | | | 701/470 |
| 2007/0222674 | A1* | 9/2007 | Tan | G06Q 10/08 |
| | | | | 342/357.32 |

(Continued)

FOREIGN PATENT DOCUMENTS

| | | |
|---|---|---|
| JP | 2006177772 A | 7/2006 |
| JP | 2011209268 A | 10/2011 |

(Continued)

OTHER PUBLICATIONS

U.S. Appl. No. 16/730,509, filed Dec. 30, 2019, Miyajima et al.

*Primary Examiner* — Dao L Phan
(74) *Attorney, Agent, or Firm* — Harness, Dickey & Pierce, P.L.C.

(57) ABSTRACT

A positioning device includes a satellite positioning unit, an autonomous positioning unit and an error estimation unit. The satellite positioning unit acquires a position of a moving object determined by satellite navigation based on navigation signals. The autonomous positioning unit estimates a movement trajectory of the moving object based on satellite information, which is information before the position of the moving object is calculated in the satellite navigation and detection values of behavior detection sensors, and estimates the position of the moving object based on a reference point and the movement trajectory of the moving object.

8 Claims, 10 Drawing Sheets

(56) References Cited

U.S. PATENT DOCUMENTS

| | | |
|---|---|---|
| 2011/0235686 A1 | 9/2011 | Kojima et al. |
| 2015/0189618 A1 | 7/2015 | Park |
| 2015/0201301 A1* | 7/2015 | Takaoka .................. H04W 4/02 455/456.1 |
| 2017/0184403 A1 | 6/2017 | Kumabe et al. |
| 2018/0172841 A1 | 6/2018 | Miyajima et al. |

FOREIGN PATENT DOCUMENTS

| | | |
|---|---|---|
| JP | 2013113789 A | 6/2013 |
| JP | 2014077769 A | 5/2014 |
| JP | 2015230218 A | 12/2015 |
| JP | 20173395 A | 1/2017 |
| JP | 20179294 A | 1/2017 |
| WO | WO-2015/118805 A1 | 8/2015 |

\* cited by examiner

POSITIONING DEVICE

CROSS REFERENCE TO RELATED APPLICATION

The present application is a continuation application of International Patent Application No. PCT/JP2018/023806 filed on Jun. 22, 2018, which designated the U.S. and claims the benefit of priority from Japanese Patent Application No. 2017-133970 filed on Jul. 7, 2017. The entire disclosures of all of the above applications are incorporated herein by reference.

TECHNICAL FIELD

The present disclosure relates to a positioning device.

BACKGROUND

Technology with a Global Navigation Satellite System (GNSS) receiver that receives navigation signals transmitted by navigation satellites included in a GNSS, may determine a current position based on the navigation signals received by the GNSS receiver. A technique of successively determining changes in the position of a moving object using the technology may also be called satellite navigation.

SUMMARY

The present disclosure describes a positioning device, which reduces positioning errors.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
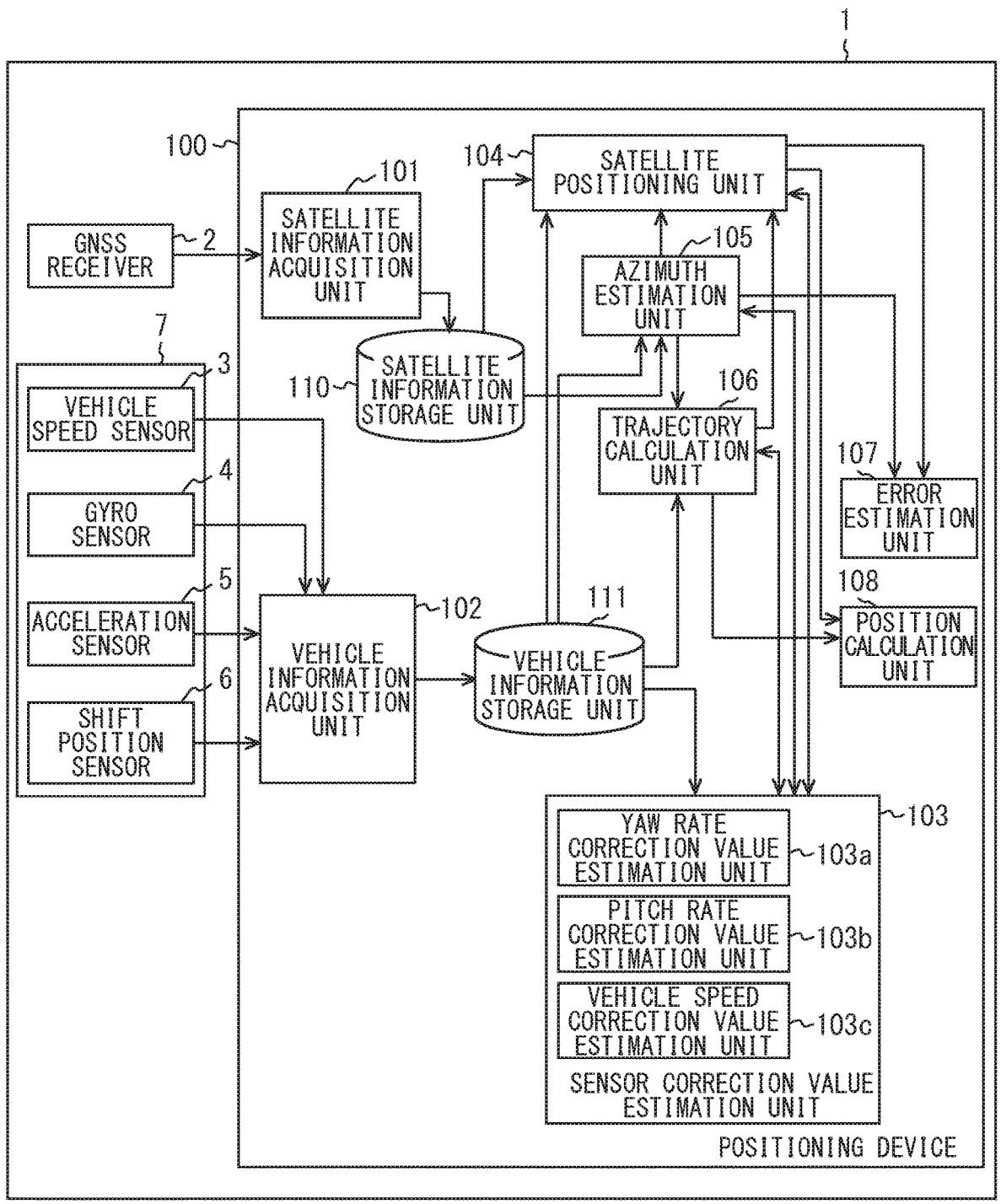
FIG. 1 is a configuration diagram of a positioning device in an embodiment.

A technique of estimating a movement trajectory of a moving object based on detection values detected by various behavior detection sensors that detect the behavior of the moving object, and estimating the position based on a reference point and the movement trajectory may be applied in a field of navigation. This technique may also be called autonomous navigation. A technique that combines satellite navigation and autonomous navigation to successively determine changes in position may also be applied in the field of navigation.

A system in a related field may determine the position of a vehicle by a combination of satellite navigation and autonomous navigation. In the related field, it is determined whether measurement data of satellite navigation may be used. If the measurement data cannot be used, positioning is switched from satellite navigation to autonomous navigation. In other words, in the related field, if measurement data of satellite navigation may be used, satellite navigation is performed. One of the conditions for determining whether measurement data of satellite navigation may be used is that a capturing number of navigation satellites is higher than or equal to a number that enables positioning, and the positioning accuracy of the captured navigation satellites is higher than or equal to a predetermined accuracy.

For example, in the related field, a method of position estimation by integrating data before position estimation such as pseudoranges obtained from navigation signals and the amount of change in position estimated from behavior detection sensors may also be applied. In the present description, this method is referred to as tight coupling. Tight coupling is a type of autonomous navigation because the tight coupling uses detection values of behavior detection sensors.

For satellite navigation, the method determines the position of a moving object by acquiring navigation signals from four or more satellites at the same timing, and solving simultaneous equations in which the three-dimensional coordinates and a clock error of the moving object are unknowns.

In addition, a method using the amount of Doppler frequency shift of navigation signals may also be applied. This method calculates a vehicle velocity vector from the amount of Doppler frequency shift, and calculates a vehicle trajectory from the velocity vector. The difference between the distance from a point on the vehicle trajectory to each satellite and a pseudorange is used as an evaluation value, and the vehicle trajectory is translated such that the evaluation value is minimized. This method is also a type of satellite navigation, because this method uses navigation signals but does not use detection values of behavior detection sensors.

When position estimation is performed by tight coupling, position estimation errors are smaller than those by autonomous navigation that does not use navigation signals. Therefore, when a position estimation method by tight coupling is performed as autonomous navigation, performing satellite navigation when measurement data of satellite navigation may increase position estimation errors.

It is an object of the present disclosure to provide a positioning device capable of reducing position estimation errors.

A positioning device according to an aspect of the present disclosure includes a satellite positioning unit, an autonomous positioning unit and an error estimation unit. The satellite positioning unit acquires a position of a moving object determined by satellite navigation based on navigation signals received by a GNSS receiver. The autonomous positioning unit estimates a movement trajectory of the moving object based on satellite information, which is information before the position of the moving object is calculated in the satellite navigation and detection values of behavior detection sensors, and estimates the position of the moving object based on a reference point and the movement trajectory of the moving object. The error estimation unit estimates a satellite positioning error that is an error in the position of the moving object determined by the satellite positioning unit, and an autonomous positioning error that is an error in the position of the moving object estimated by the autonomous positioning unit. The autonomous positioning unit uses the position of the moving object acquired by the satellite positioning unit as the reference point, in response to that the satellite positioning error is smaller than the autonomous positioning error.

The autonomous positioning unit estimates the movement trajectory based on the satellite information that is information before the position of the moving object is calculated in the satellite navigation and the detection values of the behavior detection sensors, instead of simple autonomous navigation. Consequently, accuracy is higher than that of simple autonomous navigation, so that errors may be smaller than those in the position of the moving object determined by the satellite navigation.

The satellite positioning error is compared with the autonomous positioning error. On the basis that the satellite positioning error is smaller than the autonomous positioning error as a result of the comparison, the position of the moving object acquired by the satellite positioning unit is used as a reference point used by the autonomous positioning unit. In this way, the satellite positioning error is compared with the autonomous positioning error to determine whether to use the position of the moving object acquired by the satellite positioning unit as the reference point, so that position estimation errors may be reduced.

Hereinafter, embodiments will be described with reference to the drawings. A positioning device 100 shown in FIG. 1 is mounted on a vehicle 1 that is a moving object, together with a GNSS receiver 2, a vehicle speed sensor 3, a gyro sensor 4, an acceleration sensor 5, and a shift position sensor 6.

The GNSS receiver 2 receives navigation signals transmitted by a navigation satellite Si included in a Global Navigation Satellite System (GNSS). "i" is the number of the navigation satellite. The GNSS is GPS, for example. A navigation signal is superimposed on a carrier wave and transmitted from the navigation satellite as a radio wave. Hereinafter, a radio wave transmitted by a navigation satellite is referred to as a GNSS radio wave. The GNSS receiver 2 demodulates a GNSS radio wave it has received to extract a navigation signal.

From the extracted navigation signal, a pseudorange $\rho_i$, a Doppler shift amount $D_i$, a satellite position $(X_{si}, Y_{si}, Z_{si})$, a satellite status, navigation data, etc. are determined. The navigation data includes, for example, the satellite number of the navigation satellite, an ephemeris that is orbit information of the navigation satellite, and the time when the navigation satellite has transmitted the radio wave.

The satellite position $(X_{si}, Y_{si}, Z_{si})$ of each navigation satellite Si is calculated based on the ephemeris of the navigation satellite Si and the time when the GNSS radio wave has been transmitted. The pseudorange $\rho_i$ is calculated by multiplying the time difference between the time when the navigation satellite Si has transmitted the GNSS radio wave and the time when the GNSS receiver 2 has received the GNSS radio wave, i.e. a radio wave propagation time, by the speed of light.

The Doppler shift amount $D_i$ is the frequency difference between the frequency of the carrier wave of the radio wave transmitted by the navigation satellite Si and the frequency of the carrier wave of the received GNSS radio wave. The carrier frequency of radio waves transmitted by the navigation satellite Si is determined in advance. This frequency is stored in advance in a predetermined storage unit included in the GNSS receiver 2.

The GNSS receiver 2 outputs these values to the positioning device 100 in a fixed cycle together with the S/N of the navigation signal that is the received signal and the time when the navigation signal has been received. Information output by the GNSS receiver 2 to the positioning device 100 is information before the position is calculated in satellite navigation. Hereinafter, information before the position is calculated in satellite navigation is referred to as satellite information. The fixed cycle in which the GNSS receiver 2 outputs satellite information is, for example, between 200 milliseconds and 400 milliseconds. There are plural navigation satellites. The GNSS receiver 2 determines satellite information from all navigation signals that may be demodulated from GNSS radio waves, and outputs all the determined satellite information to the positioning device 100.

The vehicle speed sensor 3 detects the wheel rotation speed of the vehicle 1. The vehicle speed sensor 3 outputs a signal indicating the wheel rotation speed to the positioning device 100.

The gyro sensor 4 and the acceleration sensor 5 are inertial sensors. The gyro sensor 4 detects rotational angular velocities around the yaw axis, pitch axis, and roll axis of the vehicle 1, and outputs a signal indicating the detected rotational angular velocities to the positioning device 100. The gyro sensor 4 functions as a yaw rate sensor because it detects the rotational angular velocity around the yaw axis, i.e. the yaw rate.

The acceleration sensor 5 detects acceleration produced in the front-rear direction of the vehicle 1. In addition to the acceleration in the front-rear direction, acceleration in the width direction and in the vertical direction of the vehicle 1 may be detected. The acceleration sensor 5 outputs a signal indicating the detected acceleration to the positioning device 100.

The shift position sensor 6 detects the shift position of the vehicle 1, and outputs a signal indicating the shift position to the positioning device 100. Based on the signal output by the shift position sensor 6, it is determined whether the movement direction of the vehicle 1 is forward or backward.

The vehicle speed sensor 3, the gyro sensor 4, the acceleration sensor 5, and the shift position sensor 6 are behavior detection sensors 7 that output signals indicating the movement, i.e. the behavior of the vehicle 1.

The positioning device 100 is a computer including a CPU, a ROM, a RAM, etc. (not shown). The CPU executes programs stored in a non-transitory tangible storage medium such as a ROM while using a temporary storage function of a RAM. Thus, the positioning device 100 performs functions as a satellite information acquisition unit 101, a vehicle information acquisition unit 102, a sensor correction value estimation unit 103, a satellite positioning unit 104, an azimuth estimation unit 105, a trajectory calculation unit 106, an error estimation unit 107, and a position calculation unit 108. When these functions are performed, methods corresponding to the programs stored in the non-transitory tangible storage medium are executed. Part or all of the functions performed by the positioning device 100 may be configured a hardware device using one or more ICs, or the like.

Outline of Processing Executed by Positioning Device

The following describes an outline of processing executed by the positioning device 100. Part of the processing executed by the positioning device 100 will be described in detail with reference to the flowcharts shown in FIG. 2 and subsequent drawings.

The satellite information acquisition unit 101 acquires satellite information from the GNSS receiver 2 in a satellite information acquisition cycle, and stores the acquired satellite information in a satellite information storage unit 110. The satellite information acquisition cycle is equal to the cycle in which the GNSS receiver 2 outputs satellite information. The satellite information storage unit 110 is a writable storage medium, and may be volatile or nonvolatile. For the satellite information storage unit 110, for example, a RAM may be used.

The vehicle information acquisition unit 102 acquires signals detected by the behavior detection sensors 7 in a sensor value acquisition cycle. The sensor value acquisition cycle is shorter than the cycle in which the GNSS receiver 2 outputs navigation signals, for example, several tens of milliseconds. The vehicle information acquisition unit 102 stores the acquired signals in a vehicle information storage unit 111. The vehicle information storage unit 111 is a writable storage medium, and may be volatile or nonvolatile. For the vehicle information storage unit 111, for example, a RAM may be used. For the vehicle information storage unit 111, the same storage medium as the satellite information storage unit 110 may be used. Information stored in the vehicle information storage unit 111 is referred to as vehicle information.

The sensor correction value estimation unit 103 corrects detection values output by the behavior detection sensors 7, and includes a yaw rate correction value estimation unit 103a, a pitch rate correction value estimation unit 103b, and a vehicle speed correction value estimation unit 103c.

The yaw rate correction value estimation unit 103a estimates a correction value for correcting a rotational angular velocity around the yaw axis (i.e. a yaw rate) detected by the gyro sensor 4 (hereinafter, a yaw rate correction value). The yaw rate correction value is estimated as follows.

An azimuth difference around the yaw axis is determined from a difference between two movement azimuths of the vehicle 1 determined by the satellite positioning unit 104 at the time of positioning. With the positioning times of the two movement azimuths being t1 and t2, the difference between an integrated value of the angular velocity around the yaw axis of the gyro sensor 4 at the time t1, i.e. a yaw rate integrated value, and a yaw rate integrated value at the time t2 is calculated.

When the azimuth difference is regarded as a true value, the difference between the azimuth difference and the difference between the yaw rate integrated values is an error in the yaw rate integrated value between the times t1 and t2. Thus, a value obtained by dividing the difference between the azimuth difference and the yaw rate integrated value between the times t1 and t2 by t1−t2 is a yaw rate correction value per unit time. The yaw rate correction value estimation unit 103a periodically updates the yaw rate correction value.

The pitch rate correction value estimation unit 103b estimates a correction value for correcting a rotational angular velocity around the pitch axis (i.e. a pitch rate) detected by the gyro sensor 4 (hereinafter, a pitch rate correction value). The pitch rate correction value is estimated as follows.

The difference between two pitch angles of the vehicle 1 (hereinafter, a pitch angle difference) determined by the satellite positioning unit 104 at the time of positioning is determined. On the other hand, with the two positioning times being t1 and t2, a pitch angle estimate value at the time t1 and a pitch angle estimate value at the time t2 are each estimated from an integrated value of the angular velocity around the pitch axis, i.e. a pitch rate integrated value successively output by the gyro sensor 4. For a pitch angle estimate value, a pitch rate integrated value is not directly used as a pitch angle estimate value. Also using a past pitch rate integrated value, a pitch angle estimate value at the present point in time is estimated. This is because the pitch angle is affected by change in the acceleration of the vehicle 1, and thus varies greatly.

Specifically, a pitch angle estimate value is determined as follows. At the point in time when sensor values are acquired, an increasing straight line of a pitch rate integrated value with respect to time is calculated by the least square method, using the latest pitch rate integrated value and the past pitch rate integrated value. The current time is substituted into the increasing straight line to determine a pitch angle estimate value at the current time. This processing is performed at each of the times t1 and t2 to determine a pitch angle estimate value at the time t1 and a pitch angle estimate value at the time t2.

The difference between the differential value between the pitch angle estimate value at the time t1 and the pitch angle estimate value at the time t2, and the pitch angle difference calculated from the pitch angles determined by the satellite positioning unit 104 is an error in the pitch rate integrated value between the times t1 and t2. A value obtained by dividing the error by t1−t2 is a pitch rate correction value per unit time. The pitch rate correction value estimation unit 103b periodically updates the pitch rate correction value.

The vehicle speed correction value estimation unit 103c estimates a vehicle speed correction value. The vehicle speed correction value is a value by which the wheel rotation speed detected by the vehicle speed sensor 3 is multiplied. A vehicle speed estimate value is calculated by multiplying a detection value of the vehicle speed sensor 3 by the tire's circumferential length and the vehicle speed correction value.

The vehicle speed correction value is estimated as follows. The azimuth estimation unit 105 determines a velocity vector using satellite information. A method of determining a velocity vector in the azimuth estimation unit 105 will be described later. A vehicle 1 traveling direction component of the velocity vector is the vehicle speed. A vehicle speed before correction is calculated by multiplying a wheel rotation speed detected by the vehicle speed sensor 3 by the tire circumference. A coefficient for making the vehicle speed before correction a vehicle speed obtained from a velocity vector determined by the azimuth estimation unit 105 is a vehicle speed correction value.

The satellite positioning unit 104 successively calculates the current position of the vehicle 1, using satellite information acquired by the satellite information acquisition unit 101 and stored in the satellite information storage unit 110. A method of calculating the current position in the satellite positioning unit 104 is called satellite navigation. Various methods of calculating a current position using satellite information may be used. For example, the satellite positioning unit 104 may use a method described in JP 2011-209268 A. The satellite positioning unit 104 may use another method which acquires navigation signals from four or more satellites at the same timing, and solves simultaneous equations in which the three-dimensional coordinates of the vehicle 1 and a clock error are unknowns. The coordinates of the vehicle 1 calculated by the satellite positioning unit 104 are referred to as satellite positioning coordinates Pvs.

The azimuth estimation unit 105 successively updates the movement azimuth of the vehicle 1, using the vehicle information stored in the vehicle information storage unit 111 or the satellite information stored in the satellite information storage unit 110. For example, for an azimuth φ, the movement azimuth of the vehicle 1 is estimated from Doppler shift amounts D that are satellite information. An azimuth estimation method will be described later with reference to FIGS. 3 and 6.

The trajectory calculation unit 106 successively calculates a movement trajectory of the vehicle 1 from the vehicle speed, the azimuth φ, and the pitch angle. The vehicle speed, the azimuth φ, and the pitch angle are calculated from either the satellite information or the vehicle information. When calculated from the vehicle information, the vehicle speed is calculated from the wheel rotation speed, the tire circumference, and the vehicle speed correction value stored in the vehicle information storage unit 111. The vehicle speed can also be estimated from the Doppler shift amounts D that are satellite information. For the azimuth φ, the movement azimuth successively estimated by the azimuth estimation unit 105 is used.

When the vehicle speed, the azimuth φ, and the pitch angle determined from the vehicle information are used for the calculation of the movement trajectory, values, which are corrected by using the yaw rate correction value, the pitch rate correction value, and the vehicle speed correction value estimated by the sensor correction value estimation unit 103, are used.

The error estimation unit 107 successively estimates an error in position successively calculated by the satellite positioning unit 104 (hereinafter, a satellite positioning error Es) and an error in position in autonomous navigation (hereinafter, an autonomous positioning error Ea). Details of processing of the error estimation unit 107 will be described in the description of the flowchart.

The position calculation unit 108 successively calculates the current position of the vehicle 1. The current position of the vehicle 1 is determined by extending the movement trajectory from a reference point. Since the movement trajectory is calculated using the vehicle information, the position is determined by autonomous navigation. Thus, the position calculation unit 108 has a function as an autonomous positioning unit. Since the vehicle information is mainly detection values of the inertial sensors, autonomous navigation is also called inertial navigation. The satellite positioning unit 104 described above performs positioning without using the vehicle information.

Reference points in the present embodiment include a real reference point Br and a virtual reference point Bv. It is possible to use only the real reference point Br as a reference point without using the virtual reference point Bv to successively calculate the current position of the vehicle 1.

For the real reference point Br, the satellite positioning coordinates Pvs are used. However, even when the satellite positioning coordinates Pvs are calculated, the real reference point Br is not updated if the satellite positioning error Es is larger than or equal to the autonomous positioning error Ea.

Flow of Processing Executed by Positioning Device

Figure 2:
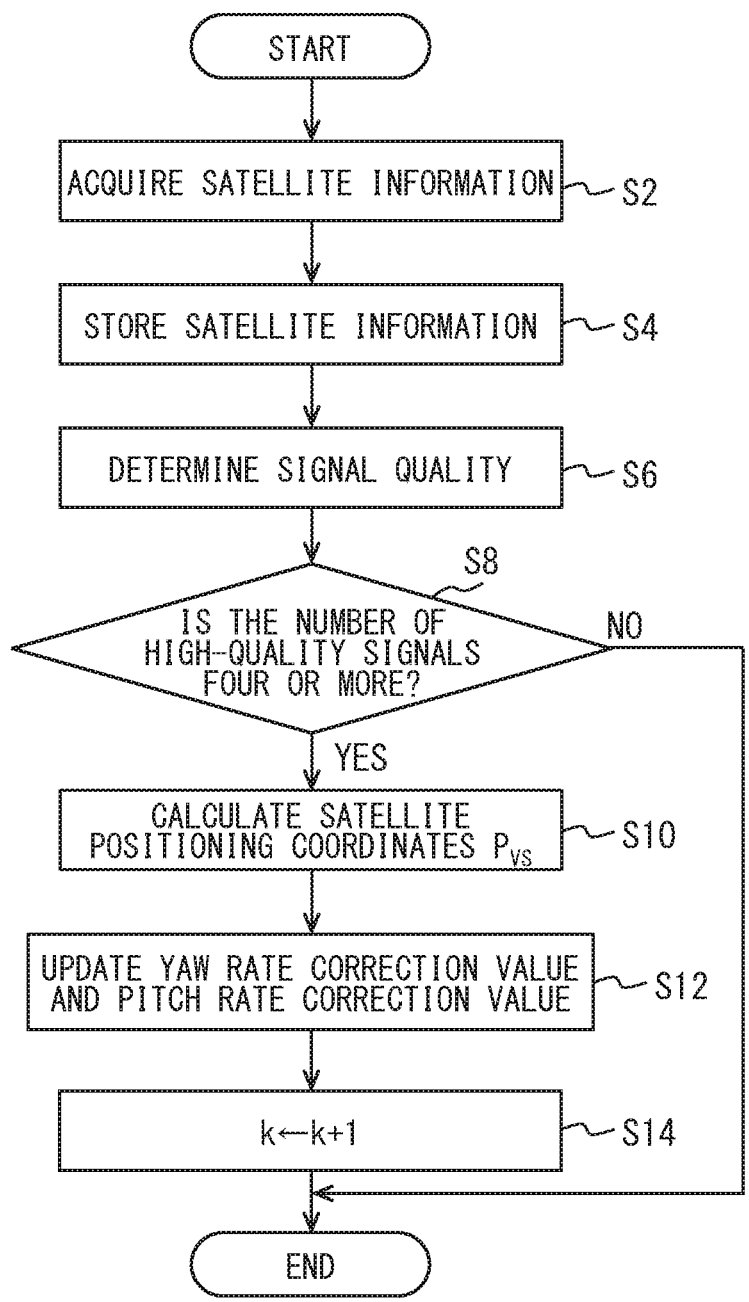
FIG. 2 is a flowchart showing processing executed by the positioning device in FIG. 1.
Figure 3:
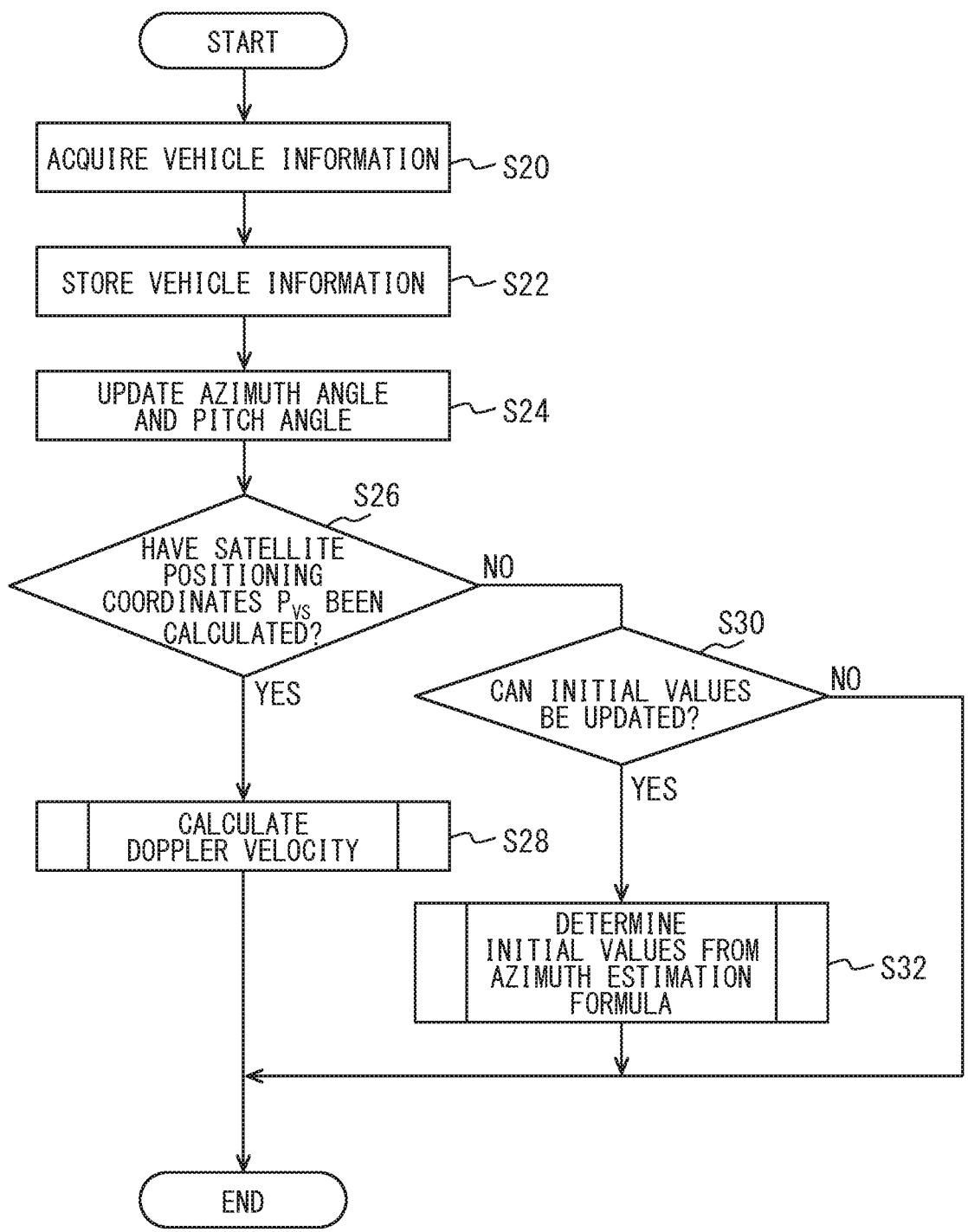
FIG. 3 is a flowchart showing processing executed by the positioning device in FIG. 1 in parallel with the processing in FIG. 2.

The positioning device 100 executes processing shown in FIG. 2 and processing shown in FIG. 3 in parallel. For example, while the processing in FIG. 2 is being executed, the processing in FIG. 3 is executed by interrupt processing. First, the processing shown in FIG. 2 will be described.

The positioning device 100 periodically executes the processing shown in FIG. 2. A cycle in which FIG. 2 is executed is the satellite information acquisition cycle. In the processing shown in FIG. 2, step (hereinafter, "step" is omitted) S2 is executed by the satellite information acquisition unit 101, S4 to S10 and S14 are executed by the satellite positioning unit 104, and S12 is executed by the yaw rate correction value estimation unit 103a and the pitch rate correction value estimation unit 103b.

In S2, satellite information is acquired from the GNSS receiver 2. In S4, the satellite information acquired in S2 is stored in the satellite information storage unit 110. Part of the satellite information may be calculated by the positioning device 100, based on navigation signals or navigation data.

In S6, it is determined whether the signal quality of a navigation signal is high. The signal quality determination is performed on all navigation signals acquired. For the determination of signal quality, various criteria may be used.

For example, whether the signal quality is high is determined based on:

(determination condition J1) the S/N is higher than or equal to a predetermined value;

(determination condition J2) the residual of the pseudorange $\rho_i$ is smaller than or equal to a criterion distance;

(determination condition J3) the elevation angle $\theta_i$ is larger than or equal to a criterion angle; and (determination condition J4) a combination of the determination conditions J1 to J3, or the like.

The residual of the pseudorange $\rho_i$ in the determination condition J2 is the difference between the distance between the satellite position $(X_{si}, Y_{si}, Z_{si})$ of the navigation satellite Si and the satellite positioning coordinates Pvs $(X_v, Y_v, Z_v)$ of the vehicle, and the pseudorange $\rho_i$. In order to calculate the residual, the satellite positioning coordinates Pvs $(X_v, Y_v, Z_v)$ of the vehicle are necessary. The satellite positioning coordinates Pvs of the vehicle are calculated by the same method as a method of calculating the satellite positioning coordinates Pvs in S10 described later. Thus, to calculate the residual of the pseudorange $\rho_i$, the satellite positioning coordinates Pvs are calculated previously.

When the residual of the pseudorange $\rho_i$ is large, a multipath influence or the like is considered, and thus it is determined that the signal quality is not high. In the determination condition J1, if the S/N is greater than or equal to the predetermined value, it is determined that the signal quality is high. In the determination condition J3, if the elevation angle $\theta_i$ is greater than or equal to the criterion angle, it is determined that the signal quality is high.

In S8, it is determined whether the number of navigation signals determined to have high signal quality in S6 is four or more. If the number is four or more, the process proceeds to S10.

In S10, the current vehicle coordinates $(X_v, Y_v, Z_v)$ are calculated from the pseudorange $\rho_i$ and the satellite position $(X_{si}, Y_{si}, Z_{si})$ of the navigation satellite Si acquired in S2. The coordinates are referred to as satellite positioning coordinates Pvs.

The satellite positioning coordinates Pvs are determined by solving four or more simultaneous equations in which the satellite positioning coordinates Pvs $(X_v, Y_v, Z_v)$ and a clock bias are unknowns. The satellite positioning coordinates Pvs $(X_v, Y_v, Z_v)$ may be calculated using various methods.

In S12, the yaw rate and the pitch rate are calculated using the satellite positioning coordinates Pvs calculated in S10 and the satellite positioning coordinates Pvs calculated previously. These are used as true values, and the differences between the true values and the yaw rate and the pitch rate obtained from detection values of the gyro sensor 4 are used as a new yaw rate correction value and a new pitch rate correction value, respectively.

In S14, 1 is added to k. The initial value of k is 0. That is, k means the number of times the satellite positioning coordinates Pvs have been calculated.

The following describes FIG. 3. The flowchart shown in FIG. 3 is repeatedly performed in the sensor value acquisition cycle. Parameters mean values at the last updated time, unless otherwise specified.

In S20, vehicle information is acquired from the behavior detection sensors 7. In S22, the vehicle information acquired in S20 is stored in the vehicle information storage unit 111.

In S24, the amount of relative azimuth angle change is calculated by multiplying a corrected yaw rate obtained by adding a yaw rate correction value to a yaw rate determined from a detection value of the gyro sensor 4 acquired in S20 by an elapsed time between the previous execution of S24 and the present point in time. The amount of relative azimuth angle change is added to a previous relative azimuth angle $\varphi^{t(-1)}_{gyro}$ to update the relative azimuth angle $\varphi^{t}_{gyro}$. The relative azimuth angle $\varphi^{t}_{gyro}$ is a relative azimuth angle at a time t with respect to the movement azimuth of the vehicle 1 at a reference point in time. Thus, the relative azimuth angle $\varphi^{t}_{gyro}$ corresponds to a reference azimuth. In S24, a relative pitch angle is also updated in the same manner as the relative azimuth angle $\varphi^{t}_{gyro}$ is updated.

In S26, it is determined whether the satellite positioning coordinates Pvs have been calculated since S26 had been executed last time until S26 is executed this time. The satellite positioning coordinates Pvs have been calculated in S10. However, to calculate the satellite positioning coordinates Pvs, it is necessary to acquire satellite information, and the cycle in which satellite information is acquired is longer than the cycle in which vehicle information is acquired. Further, even when satellite information is acquired, the satellite positioning coordinates Pvs are not calculated unless four or more high-quality navigation signals have been acquired. Furthermore, after navigation signals are acquired, calculation is also required and the calculation requires time. Consequently, the determination in S26 may be NO.

If the determination in S26 is YES, the process proceeds to S28. In S28, a Doppler velocity is calculated. The Doppler velocity means the velocity vector (Vx, Vy, Vz) of the vehicle or the magnitude of the velocity vector. Since the velocity vector (Vx, Vy, Vz) is calculated using the Doppler shift amounts D, it is herein referred to as a Doppler velocity.

Figure 4:
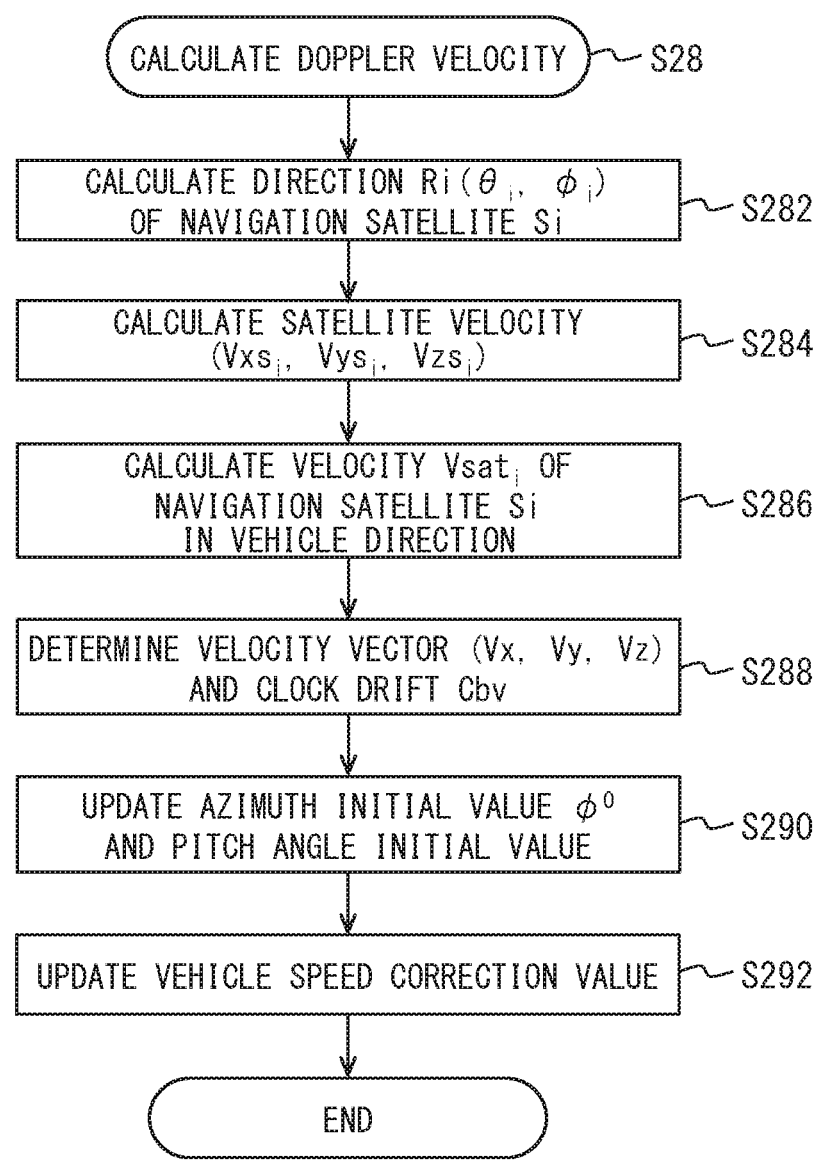
FIG. 4 is a flowchart showing in detail processing to calculate a Doppler velocity in FIG. 3.

Detailed processing in S28 is shown in FIG. 4. In FIG. 4, in S282, the direction $R_i(\theta_i, \varphi_i)$ of each navigation satellite Si is calculated from the satellite positioning coordinates Pvs $(X_v, Y_v, Z_v)$ calculated in S10 and the satellite position $(X_{si}, Y_{si}, Z_{si})$ of the navigation satellite Si stored in the satellite information storage unit 110 in S2. The direction $R_i$ of each navigation satellite Si is represented by an elevation angle $\theta_i$ with respect to the horizontal direction and an azimuth angle $\varphi_i$ with respect to the north direction when the navigation satellite Si is viewed from the vehicle 1.

In S284, the velocity vector $(Vxs_i, Vys_i, Vzs_i)$ of each navigation satellite Si is calculated from time-series data of the satellite position $(X_{si}, Y_{si}, Z_{si})$ of the navigation satellite Si calculated in S4 by a method using a derivative of Keplers equation.

In S286, the velocity Vsat$_i$ of each navigation satellite Si in the vehicle direction is determined by Vsat$_i$=R$_i$[Vxs$_i$, Vys$_i$, Vzs$_i$]$^T$ from the direction R$_i$ of the navigation satellite Si calculated in S282 and the velocity vector $(Vxs_i, Vys_i, Vzs_i)$ of the navigation satellite Si calculated in S284. T means transposition of the matrix.

In S288, four or more simultaneous equations shown in formula (1) are formulated, and the simultaneous equations are solved. Consequently, the velocity vector (Vx, Vy, Vz) of the vehicle 1 and a clock drift Cbv$^t$ of a clock included in the GNSS receiver 2 may be determined.

[Formula 1]

$$\begin{pmatrix} Vsat_0 + D_0 \cdot C/F \\ Vsat_1 + D_1 \cdot C/F \\ \vdots \\ Vsat_i + D_i \cdot C/F \end{pmatrix} = \begin{pmatrix} -\cos\theta_0\sin\phi_0 & \cos\theta_0\cos\phi_0 & \sin\theta_0 & -1 \\ -\cos\theta_1\sin\phi_1 & \cos\theta_1\cos\phi_1 & \sin\theta_1 & -1 \\ \vdots & \vdots & \vdots & \vdots \\ -\cos\theta_i\sin\phi_i & \cos\theta_i\cos\phi_i & \sin\theta_i & -1 \end{pmatrix} \cdot \begin{pmatrix} Vx \\ Vy \\ Vz \\ Cbv \end{pmatrix} \quad (1)$$

In formula (1), $D_i$ is the Doppler shift amount, C is a light speed, and F is the frequency of the carrier wave of radio waves transmitted by the navigation satellite Si. Formula (1) is disclosed in JP 2013-113789 A, and thus a derivation method of formula (1) will not be described.

When there are four or more navigation satellites from which GNSS radio waves have been received, the simultaneous equations in formula (1) described above may be solved. However, even if GNSS radio waves have been received, GNSS radio waves that cannot be determined to have high signal quality are excluded. Thus, when GNSS radio waves that have been determined to have navigation signals of high signal quality in S8 have been received from four or more navigation satellites, the velocity vector of the vehicle is calculated from formula (1).

When the velocity vector is obtained, the three-dimensional movement azimuth of the vehicle 1 is obtained. Thus, in S290, the azimuth angle and the pitch angle at which the vehicle 1 travels determined from the velocity vector are updated as an azimuth initial value $\varphi^0$ and a pitch angle initial value. The processing so far in FIG. 4 is executed by the azimuth estimation unit 105.

In S292, the vehicle speed correction value is updated from the speed of the vehicle 1 in the traveling direction determined from the velocity vector and the vehicle speed that may be calculated from the wheel rotation speed detected by the vehicle speed sensor 3. S292 is executed by the vehicle speed correction value estimation unit 103c.

Figure 6:
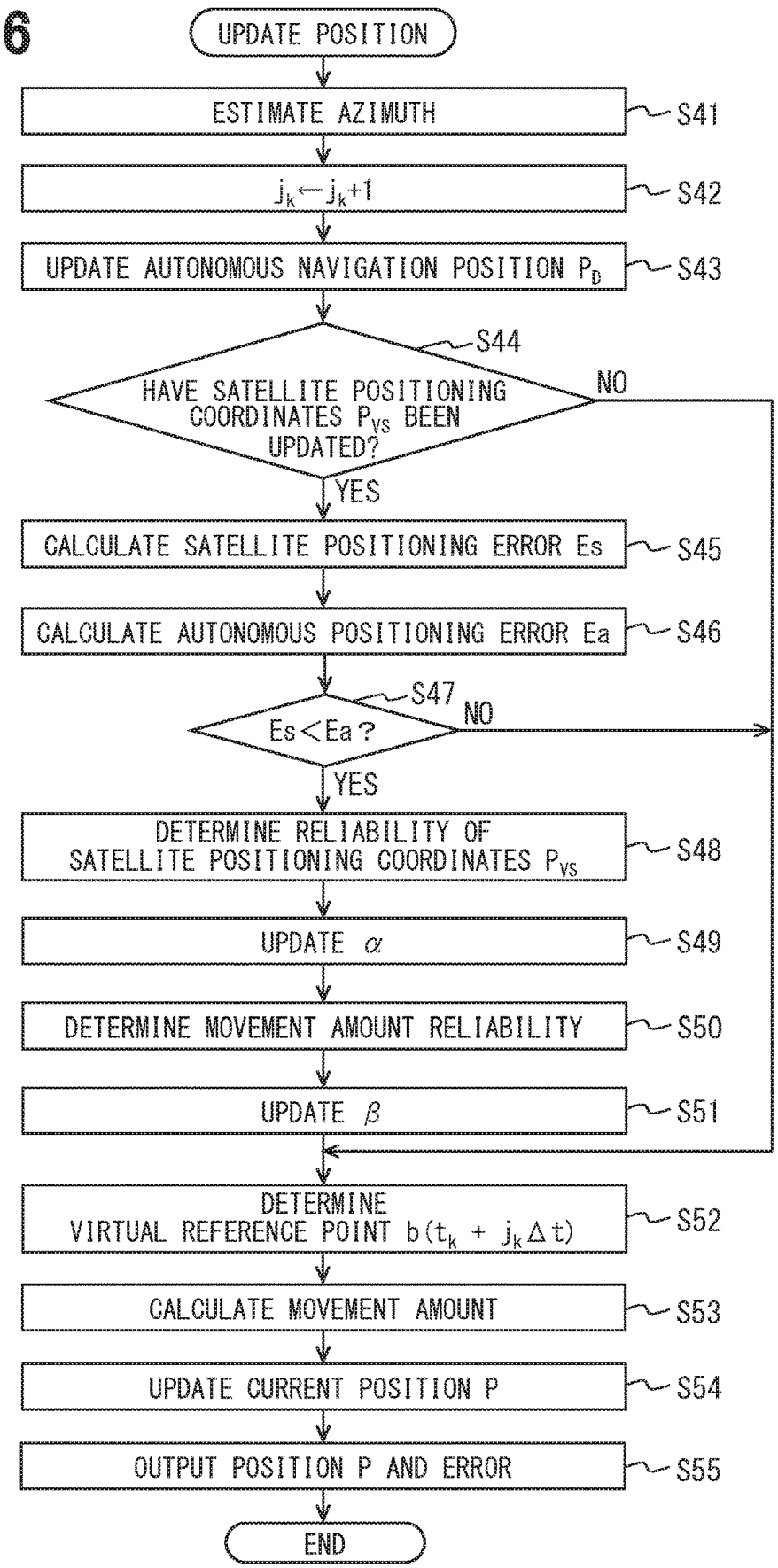
FIG. 6 is a flowchart showing processing executed after execution of FIG. 3.

The description is returned to FIG. 3. When S28 has been executed, position update processing shown in FIG. 6 is executed. Before describing the position update processing, S30 and subsequent steps will be described.

If it is determined in S26 that the satellite positioning coordinates Pvs have not been calculated, the process proceeds to S30. In S30, it is determined whether initial values may be updated. Specifically, this determination is for determining whether three or more azimuth estimation formulas shown in formula (2) may be formulated, using navigation signals after the azimuth initial value $\varphi^0$ has been updated.

[Formula 2]

$$Vs^t_i = V^t_{wheel}Gx^t_i\cos(\phi^0+\phi^t_{gyro})+V^t_{wheel}Gy^t_i\sin(\phi^0+\phi^t_{gyro})-Cbv^0-At \quad (2)$$

Formula (2) is an equation disclosed as a final velocity vector calculation formula in JP 2013-113789 A. In formula (2), Vs is a satellite direction velocity, t is a time, $V_{wheel}$ is a detection value of the vehicle speed sensor 3, $\varphi^0$ is an azimuth angle of the vehicle 1 in a traveling direction at an initial time (i.e. an azimuth initial value), $\varphi_{gyro}$ is an integrated value of the azimuth angle of the vehicle 1 in the traveling direction, i.e. a relative azimuth angle, $Cbv^0$ is a clock drift at the initial time, A is the slope of change of the clock drift over time, and Gx and Gy are respectively an x component and a y component of a line-of-sight vector from the vehicle to the navigation satellite Si.

In the present embodiment, the velocity vector of the vehicle 1 has been calculated in S28 that has already been described. If the velocity vector may be calculated, the azimuth of the vehicle 1 may be determined. However, to calculate the velocity vector (Vx, Vy, Vz) of the vehicle 1 in S28, the satellite positioning coordinates Pvs are required. Thus, unless GNSS radio waves of high signal quality may be received from four or more navigation satellites, the velocity vector (Vx, Vy, Vz) of the vehicle 1 cannot be calculated.

For example, in an urban area with many high-rise buildings, the time during which the velocity vector (Vx, Vy, Vz) cannot be calculated may be long. Even in an environment where four or more GNSS radio waves of high signal quality may be received, S26 is YES only in a fixed cycle of 200 milliseconds to 400 milliseconds. The velocity vector (Vx, Vy, Vz) of the vehicle 1 may be calculated only in the cycle in which S26 is YES.

On the other hand, detection values of the behavior detection sensors 7 may be acquired in a fixed cycle regardless of driving environment, and may be acquired in a cycle shorter than the cycle in which the velocity vector (Vx, Vy, Vz) may be calculated, for example, every 20 ms.

Azimuth estimation and speed estimation are performed, based on detection values of the behavior detection sensors 7 between calculation of the velocity vector (Vx, Vy, Vz) of the vehicle 1 and next calculation of the velocity vector (Vx, Vy, Vz) of the vehicle 1. Initial values used in the azimuth estimation and the speed estimation are determined in S32.

Figure 5:
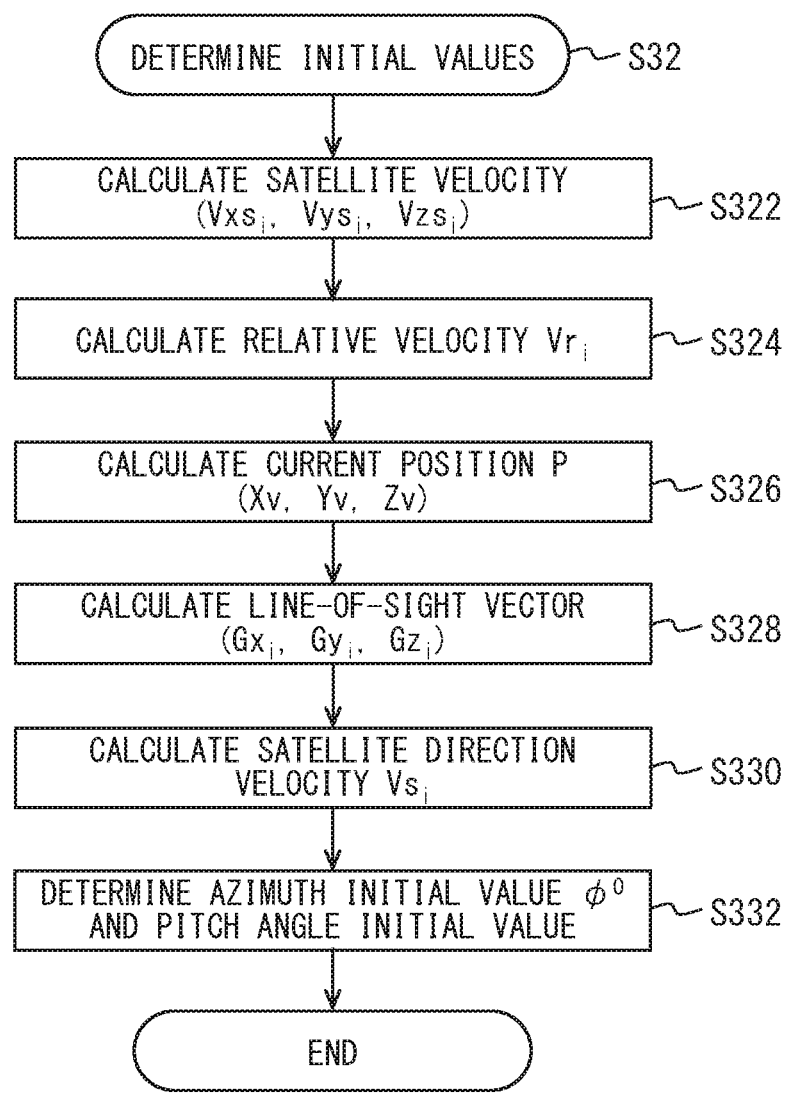
FIG. 5 is a flowchart showing in detail processing to determine an initial value from an azimuth estimation formula in FIG. 3.

In S32, specifically, processing shown in FIG. 5 is executed. S32 is executed by the azimuth estimation unit 105. In FIG. 5, in S322, the velocity vector $(Vxs_i, Vys_i, Vzs_i)$ of each navigation satellite Si is calculated from the time-series data of the satellite position $(X_{si}, Y_{si}, Z_{si})$ of the navigation satellite Si calculated in S4.

In S324, the Doppler shift amount $D_i$ included in the satellite information acquired in S2 and stored in S4 is substituted into formula (3) to calculate the relative velocity $Vr_i$ of the vehicle with respect to the navigation satellite Si.

[Formula 3]

$$Vr_i = -D_i \cdot C/F \quad (3)$$

In S326, the current position $P(X_v, Y_v, Z_v)$ of the vehicle 1 is calculated. When S326 is executed, four or more high-quality navigation signals have not been received since S26 has been NO. However, the position $P(X_v, Y_v, Z_v)$ calculated in S326 is used to calculate the line-of-sight vector $(Gx_i, Gy_i, Gz_i)$ from the vehicle 1 to the navigation satellite Si in next S328.

Since the navigation satellite Si is located in the distance, the current position used for determining the angle between the navigation satellite Si and the vehicle 1 may be low in accuracy. Thus, it may be unnecessary to have received four or more high-quality signals.

For example, in S326, using four or more navigation signals including any signal that cannot be determined to be of high quality, the current satellite positioning coordinates Pvs of the vehicle 1 are calculated as in S10, and the satellite positioning coordinates Pvs are used as the current position $P(X_v, Y_v, Z_v)$ of the vehicle 1.

The position $P(X_v, Y_v, Z_v)$ of the vehicle 1 may be determined by a method with low accuracy other than position determination using the pseudorange $\rho_i$. Depending on estimation accuracy allowed in a system or the like, a position error of the vehicle 1 in the range of several hundreds of meters results in a speed estimation error of 1 m/sec or smaller, causing no significant problem. Thus, for example, the position may be determined from a map or the like, or the position $P(X_v, Y_v, Z_v)$ of the vehicle 1 may be determined from information such as a past position determination history or a beacon.

Since the accuracy may be low, in the position update processing (FIG. 6) described later, the position P of the vehicle 1 updated last time may be used as the position $P(X_v, Y_v, Z_v)$ of the vehicle 1 here.

In S328, the line-of-sight vector $(Gx_i, Gy_i, Gz_i)$ from the vehicle 1 to the navigation satellite Si is calculated. The x component, y component, and z component of the line-of-sight vector are calculated from formula (4).

[Formula 4]

$$Gx_i^t = \frac{1}{\rho_i^t}(X_{si}^t - X_v^t),\ Gy_i^t = \frac{1}{\rho_i^t}(Y_{si}^t - Y_v^t),\ Gz_i^t = \frac{1}{\rho_i^t}(Z_{si}^t - Z_v^t) \quad (4)$$

In formula (4), $\rho_i^t$ is the pseudorange of the navigation satellite Si at a time t, and $(X_{si}^t, Y_{si}^t, Z_{si}^t)$ is the satellite position of the navigation satellite Si at the time t. These are stored in S4. $(X_v^t, Y_v^t, Z_v^t)$ is the current position of the vehicle 1 at the time t, and is calculated in S326.

In S330, the relative velocity $Vr_i$ calculated in S324, the line-of-sight vector $(Gx_i, Gy_i, Gz_i)$ calculated in S328, and the velocity vector $(Vxs_i, Vys_i, Vzs_i)$ of the navigation satellite Si calculated in S322 are substituted into formula (5) to calculate the satellite direction velocity $Vs_i$ of the vehicle 1 in the direction of the navigation satellite Si.

[Formula 5]

$$Vs_i^t = \frac{D_i^t}{f}C + Gx_i^t Vxs_i^t + Gy_i^t Vys_i^t + Gz_i^t Vzs_i^t \quad (5)$$

The first term on the right side of formula (5) means the relative velocity $Vr_i$ of the vehicle 1 with respect to the navigation satellite Si, and the second to fourth terms mean the velocity of the navigation satellite Si in the direction of the vehicle 1. The sum of these terms means the velocity of the vehicle 1 in the direction of the navigation satellite Si, and thus formula (5) holds.

In S332, the satellite direction velocity $Vs_i$ calculated in S330, the relative azimuth angle $\varphi_{gyro}$ updated in S24, and the line-of-sight vector $(Gx_i, Gy_i, Gz_i)$ calculated in S328 are substituted into formula (2). This results in three unknown parameters, $\varphi^0$, $Cbv^0$, and A in formula (2).

Thus, three or more equations are formulated by substituting the satellite direction velocity $Vs_i$, the relative azimuth angle $\varphi_{gyro}$, and the line-of-sight vector $(Gx_i, Gy_i, Gz_i)$ into formula (2). Then, simultaneous equations of the three or more equations are solved. As a result, the azimuth initial value $\varphi^0$ that is an unknown parameter in formula (2) may be determined.

The unknown parameters $\varphi^0$, Cbv$^0$, and A are the same even at different times after the initial time. Therefore, it is not necessary to formulate three equations at the same time. If the total number of equations formulated at plural times is three or more, the unknown parameters may be determined. For example, even if the number of observed satellites at each of three times ($t_0$, $t_1$, $t_2$) is one, the azimuth initial value $\varphi^0$ may be determined using data from the observed navigation satellites.

In S332, a pitch angle initial value is also determined. A way of determining the pitch angle initial value is the same as for the azimuth initial value. That is, the pitch angle initial value is determined by formulating three or more equations in which Gx and Gy are replaced with Gy and Gz, and θ is replaced with φ in formula (2).

When the processing shown in FIG. 3 has been completed, the position update processing shown in FIG. 6 is executed. In FIGS. 3, S20 and S22 are processing of the vehicle information acquisition unit 102, and S24 and subsequent steps are processing of the azimuth estimation unit 105.

The following describes FIG. 6. In FIG. 6, in S41, an estimated azimuth $\varphi_e$ obtained by estimating an azimuth in which the vehicle 1 moves is determined. If a velocity vector has been determined by executing S28, the estimated azimuth is determined from the velocity vector. An estimated pitch angle is also determined from the velocity vector.

When a line-of-sight vector from the vehicle 1 to the navigation satellite Si has been calculated by executing S32, an azimuth in which the vehicle 1 faces, i.e. the estimated azimuth $\varphi_e$ is determined from the line-of-sight vector and the position of the navigation satellite Si.

On the other hand, if the determination in S30 is NO and S32 is not executed, the estimated azimuth $\varphi_e$ is calculated from the latest azimuth initial value $\varphi^0$ and the relative azimuth angle $\varphi_{gyro}$ updated in S24. Also, the estimated pitch angle is calculated from the latest pitch angle initial value and the relative pitch angle updated in S24.

In S42, 1 is added to $j_k$ in $\alpha+j_k\beta$, which is not 1 or more. The initial value of $j_k$ is 0. As described in S14, k increments by 1 every time the satellite positioning coordinates Pvs are calculated. Thus, a new $j_k$ is generated every time the satellite positioning coordinates Pvs are calculated. The initial value of $j_k$ is 0, and $j_k$ is 0 at a time $t_k$. The time $t_k$ is the time when the navigation signals used to calculate the satellite positioning coordinates Pvs($t_k$) have been received. $j_k$ increments by 1 every time FIG. 6 is executed. Thus, $j_k$ means the number of times the processing in FIG. 6 has been executed after the time $t_k$. The meanings of α and β will be described in S49 and S51.

In subsequent S43, an autonomous navigation position $P_D(t)$ is updated. The autonomous navigation position $P_D(t)$ is updated by adding a distance obtained by multiplying the latest vehicle speed estimate value by the update cycle of the autonomous navigation position $P_D$, to a previous autonomous navigation position $P_D(t-1)$ in the direction of the estimated azimuth $\varphi_e$ and the estimated pitch angle calculated in S41 this time. The movement trajectory is updated by the processing in S43.

In S44, it is determined whether the satellite positioning coordinates Pvs have been updated between the previous execution of S44 and the present execution of S44. If the determination in S44 is NO, the process proceeds to S52 without executing S45 to S51. If the determination in S44 is YES, the process proceeds to S45.

In S45, a satellite positioning error Es is calculated. The satellite positioning error Es may be calculated by various methods. In the present embodiment, the residual of the pseudorange $\rho_i$ (hereinafter, a pseudorange residual) is used as the satellite positioning error Es.

In S46, an autonomous positioning error Ea is calculated. The autonomous positioning error Ea is a value obtained by adding an error of autonomous navigation to the satellite positioning error Es in the real reference point Br that is used as a reference point of autonomous navigation. The error of autonomous navigation is a value obtained by multiplying the duration of autonomous navigation by an error of autonomous navigation per unit time. The error of autonomous navigation may be a value obtained by multiplying a travel distance in autonomous navigation by an error of autonomous navigation per unit distance.

In the present embodiment, the error of autonomous navigation per unit time or the error of autonomous navigation per unit distance when the estimated azimuth $\varphi_e$ is estimated based on the Doppler shift amount $D_i$ is set smaller than when the estimated azimuth $\varphi_e$ is determined from the detection value of the gyro sensor 4. The error of autonomous navigation per unit time or the error of autonomous navigation per unit distance is set in advance by measurement with actual equipment or the like.

The time when the estimated azimuth $\varphi_e$ is estimated based on the Doppler shift amount Di is the time when S28 is executed or when S32 is executed. On the other hand, the estimated azimuth $\varphi_e$ is determined from the detection value of the gyro sensor 4 when the determination in S30 is NO.

In S47, it is determined whether the satellite positioning error Es calculated in S45 is smaller than the autonomous positioning error Ea calculated in S46. If the determination is NO, the process proceeds to S52, and if YES, the process proceeds to S48.

In S48, the reliability of the satellite positioning coordinates Pvs is determined. The reliability of the satellite positioning coordinates Pvs may be calculated by various methods. For example, the reliability of the satellite positioning coordinates Pvs is determined using a preset correspondence between one of (1) the number of navigation signals used to calculate the satellite positioning coordinates Pvs, (2) the S/N of navigation signals, (3) the pseudorange residual, and (4) the elevation angle $\theta_i$ of the navigation satellite Si, or a combination of (1) to (4), and the reliability.

In S49, an offset term α included in a virtual reference point calculation formula shown in formula (7) is updated. Formula (7) shows an equation representing a virtual reference point derivation function F{P} shown in formula (6) in the present embodiment.

[Formula 6]

$$Bv(t_k+j_k\Delta t)=F(\{P\},t_k+j_k\Delta t) \qquad (6)$$

[Formula 7]

$$F\{P\}=(1-\alpha-j_k\beta)P(t_k)+(\alpha+j_k\beta)Br(t_k) \qquad (7)$$

In formulas (6) and (7), k in a time $t_k$ is an integer, and the time $t_k$ is the point in time when the navigation signals used to calculate the satellite positioning coordinates Pvs have been received.

In formula (6), Δt is a cycle in which the position P of the vehicle 1 is updated by autonomous navigation. Hereinafter, this cycle is referred to as an autonomous navigation cycle. The autonomous navigation cycle is equal to the sensor value acquisition cycle.

Since $\Delta t$ is the autonomous navigation cycle, and $j_k$ means the number of executions of the processing in FIG. 6 after the satellite positioning coordinates Pvs are updated, $j_k \Delta t$ means an elapsed time between the update of the satellite positioning coordinates Pvs and the present point in time.

Formula (6) expresses the following. The virtual reference point $Bv(t_k+j_k\Delta t)$ at a time $t_k+j_k\Delta t$ is coordinates represented by the virtual reference point derivation function $F\{P\}$ at the time $t_k+j_k\Delta t$.

Formula (7) expresses the following. The coordinates represented by the virtual reference point derivation function $F\{P\}$ at the time $t_k+j_k\Delta t$ are values obtained by adding the latest satellite positioning coordinates Pvs ($t_k$) at that point in time and the position $P(t_k)$ of the vehicle 1 determined at the time $t_k$ multiplied by weighting factors.

Since $j_k$ is an integer greater than or equal to 0, the value of $-j_k\beta$ decreases every time $j_k$ increases. In FIG. 6, the movement amount $\Delta P_D$ of the vehicle 1 is calculated in S53 described later. Thus, $-j_k\beta$ is a decrease term whose value decreases in accordance with the number of times the movement amount $\Delta P_D$ has been calculated. On the other hand, $j_k\beta$ is an increase term whose value increases in accordance with the number of times the movement amount $\Delta P_D$ has been calculated. $(1-\alpha-j_k\beta)$ including $-j_k\beta$ that is a decrease term is used as a first factor calculation formula, and $(\alpha+j_k\beta)$ including $j_k\beta$ that is an increase term is used as a second factor calculation formula.

In the virtual reference point calculation formula, $(1-\alpha-j_k\beta)$ by which the position $P(t_k)$ of the vehicle 1 is multiplied and $(\alpha+j_k\beta)$ by which the satellite positioning coordinates Pvs($t_k$) are multiplied mean weighting factors. The virtual reference point $Bv(t_k+j_k\beta)$ after the time $t_k$ is a position in a ratio determined by $(1-\alpha-j_k\beta)$ and $(\alpha+j_k\beta)$ between the position $P(t_k)$ of the vehicle 1 at the time $t_k$ and the satellite positioning coordinates Pvs($t_k$) at the time $t_k$. The virtual reference point $Bv(t_k+j_k\Delta t)$ becomes closer to the satellite positioning coordinates Pvs($t_k$) as the number of times the movement amount $\Delta P_D$ has been calculated increases.

In the virtual reference point calculation formula, the offset term $\alpha$ is constant independently of $j_k$. The greater the offset term $\alpha$ is, the closer the virtual reference point $Bv(t_k+j_k\Delta t)$ is to the satellite positioning coordinates Pvs($t_k$) from when $j_k$=0.

The reason for calculating the virtual reference point $Bv(t_k+j_k\Delta t)$ is to prevent the position of the vehicle 1 from changing discontinuously in a larger scale. The lower the accuracy of the satellite positioning coordinates Pvs($t_k$) is, the more the position of the vehicle 1 changes discontinuously in a larger scale. Thus, the more reliable the satellite positioning coordinates Pvs($t_k$) is, the closer the virtual reference point $Bv(t_k+j_k\Delta t)$ may be brought to the satellite positioning coordinates Pvs($t_k$).

In S49, the value of $\alpha$ is increased according to the reliability of the satellite positioning coordinates Pvs. Specifically, a correspondence between the reliability of the satellite positioning coordinates Pvs and $\alpha$ is set in advance, and the value of $\alpha$ is updated from the reliability determined this time and the correspondence. The correspondence between the reliability of the satellite positioning coordinates Pvs and $\alpha$ is a relationship in which the higher the reliability of the satellite positioning coordinates Pvs is, the larger $\alpha$ becomes stepwise or continuously.

In S50, the movement amount reliability is determined. The movement amount reliability means the reliability of the movement amount $\Delta P_D$ calculated in S53 described later. In autonomous navigation, errors accumulate. That is, the longer the period during which the position P of the vehicle 1 is updated by autonomous navigation is, the larger the error is. Therefore, in S50, the longer the period during which the position P of the vehicle 1 is updated only by autonomous navigation without updating the satellite positioning coordinates Pvs is, the lower the movement amount reliability is made. As the period during which the satellite positioning coordinates Pvs are not updated, the value of $j_k$ updated in S42 may be used.

In S51, the higher the movement amount reliability determined in S50 is, the smaller value $\beta$ is updated to. The reason is that the higher the movement amount reliability is, the lower the need to bring the virtual reference point $Bv(t_k+j_k\Delta t)$ close to the satellite positioning coordinates Pvs($t_k$) early is.

Specifically, in S51, an updated $\beta$ is determined from the preset relationship in which the higher the movement amount reliability is, the smaller $\beta$ becomes stepwise or continuously, and the movement amount reliability determined in S50.

In S52, the position $P(t_k)$ of the vehicle 1 at the time $t_k$ and the satellite positioning coordinates Pvs($t_k$) calculated from the navigation signals received at the time $t_k$ are substituted into the latest virtual reference point calculation formula to calculate the virtual reference point $Bv(t_k+j_k\Delta t)$ at the time $t_k+j_k\Delta t$.

In S53, the movement amount $\Delta P_D$ by which the vehicle 1 has moved from the time $t_k$ to the current time $t_k+j_k\Delta t$ is calculated from formula (8). As may be seen from formula (8), the movement amount $\Delta P_D$ is calculated using the autonomous navigation position $P_D$ calculated in S43.

[Formula 8]

$$\Delta P_D = P_D(t_k+t_k\Delta t) - P_D(t_k) \tag{8}$$

In S54, the current position P of the vehicle 1 is updated, using formula (9).

[Formula 9]

$$P=\Delta P_D + Bv(t_k+j_k\Delta t) = P_D(t_k+j_k\Delta t) - P_D(t_k) + Bv(t_k+j_k\Delta t) \tag{9}$$

As shown in formula (9), the virtual reference point $Bv(t_k+j_k\Delta t)$ is used as a reference point that is the base point of the movement amount $\Delta P_D$, and the virtual reference point $Bv(t_k+j_k\Delta t)$ approaches the satellite positioning coordinates Pvs($t_k$) as $j_k$ increases. Consequently, as described in JP 2017-9294 A, it is possible to prevent a trajectory representing the position P of the vehicle 1 from changing in a stepwise manner.

In S55, the position P of the vehicle 1 determined in S54 and an error in the position P are output to a device, which executes an application using the position P of the vehicle 1 and the error in the position P. The error is a smaller value of the satellite positioning error Es and the autonomous positioning error Ea calculated in S44 and S46. In addition to the position P of the vehicle 1 and the error, the latest azimuth, the latest azimuth error, the latest yaw angle, the latest pitch angle, the latest vehicle speed, etc. may be output together.

In FIG. 6, S41 is processing of the azimuth estimation unit 105, S43 is processing of the trajectory calculation unit 106, S45 and S46 are processing of the error estimation unit 107, and the remaining is processing of the position calculation unit 108.

In the present embodiment, since the azimuth initial value $\varphi^0$ and the pitch angle initial value are calculated using the Doppler shift amount Di that is satellite information, the estimated azimuth $\varphi_e$ and the estimated pitch angle with high accuracy may be obtained. This increases the accuracy of the movement trajectory, thus reducing an increase in error with the passage of time or with an increase in movement distance in autonomous navigation using the movement trajectory. Thus, even when the satellite positioning coordinates Pvs are obtained, an increase in error may be reduced more by not updating the reference point.

In the present embodiment, when the satellite positioning coordinates Pvs are updated (S44: YES), the satellite positioning error Es is compared with the autonomous positioning error Ea. When it is determined that the satellite positioning error Es is smaller than the autonomous positioning error Ea, S48 and subsequent steps are executed to update the virtual reference point derivation function F{P}. The virtual reference point By is used as a reference point for calculating the position P of the vehicle 1 in formula (9).

When the satellite positioning error Es is smaller than the autonomous positioning error Ea, the updated satellite positioning coordinates Pvs are used as a reference point for calculating the position P of the vehicle 1. In other words, even when new satellite positioning coordinates Pvs are obtained, the satellite positioning coordinates Pvs are not used as a reference point for calculating the position P of the vehicle 1 if the satellite positioning error Es is larger than the autonomous positioning error Ea. This can reduce errors in position estimation.

Figure 7:
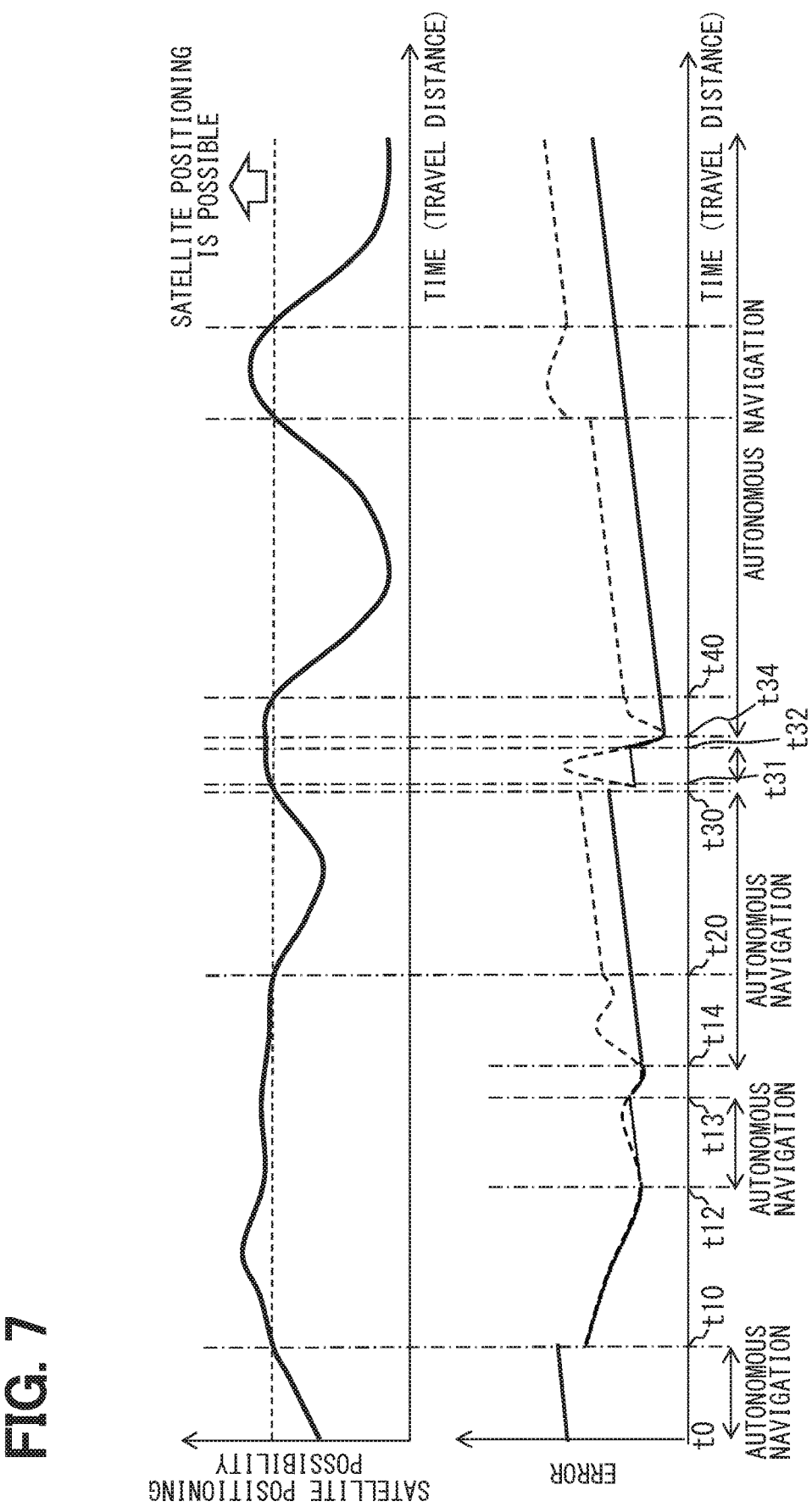
FIG. 7 is a diagram showing an example of variation in an error when the first embodiment is implemented.

FIG. 7 shows an example of error variation in the present embodiment. In FIG. 7, the horizontal axis represents time. When the vehicle 1 is traveling, travel distance increases with the passage of time. Thus, the horizontal axis may be considered as travel distance.

The vertical axis in an upper graph of FIG. 7 represents satellite positioning possibility. The satellite positioning possibility corresponds to the number of navigation signals that may be used for positioning. Whether a navigation signal may be used for positioning may be determined by a criterion for determining whether the signal quality is high. A broken line in the upper graph of FIG. 7 indicates a threshold of the satellite positioning possibility at which satellite positioning may be determined to be possible.

The vertical axis in a lower graph of FIG. 7 represents error in determined position. A solid line is an error in the present embodiment. A broken line is an error in a comparative example. The comparative example here is a positioning method that constantly updates a reference point to the satellite positioning coordinates Pvs when the satellite positioning possibility exceeds the threshold.

Since the satellite positioning possibility does not exceed the threshold between times t0 and t10, autonomous navigation is performed without updating the reference point. In the description of FIGS. 7 to 10, autonomous navigation means that autonomous navigation is continued without updating the reference point, and satellite positioning means that autonomous navigation is performed while updating the reference point to the latest satellite positioning coordinates Pvs.

Since autonomous navigation is continued from t0 to t10, the error increases linearly with a constant slope. Since the satellite positioning possibility exceeds the threshold at t10, the satellite positioning coordinates Pvs are updated. This reduces the error. Thereafter, the reference point is continuously updated to the satellite positioning coordinates Pvs obtained by satellite positioning. As a result, from t10 to t12, the error does not increase with the passage of time. In the comparative example, the reference point is continuously updated using the satellite positioning coordinates Pvs obtained by satellite positioning until t20. However, the error of the satellite positioning coordinates Pvs is not constant even if the satellite positioning possibility exceeds the threshold, and varies due to various factors.

In the example of FIG. 7, from t12 to t13, satellite positioning remains possible, but the satellite positioning error Es is larger than that at the point in time t12. Although the error of autonomous navigation also increases from t12 to t13, the autonomous positioning error Ea is smaller than the satellite positioning error Es indicated by the broken line. Therefore, in the present embodiment, autonomous navigation is performed from t12 to t13 even though satellite positioning is possible.

Similarly, from t14 to t20, autonomous navigation is performed even though satellite positioning is possible. As a result, the error of the present embodiment at the point in time t20 when satellite positioning has become impossible is smaller than that of the comparative example.

At t30, satellite positioning becomes possible, and temporary switching to satellite positioning is done. However, between t31 and t32 during which the satellite positioning error Es is large, autonomous navigation is performed even though satellite positioning is possible. From t32 to t34, satellite positioning is performed, but switching to autonomous navigation is done again at t34. Even when satellite positioning is possible, the positioning device 100 of the present embodiment does not update the reference point to the satellite positioning coordinates Pvs if the satellite positioning error Es is larger than the autonomous positioning error Ea, so that the error may be made smaller than that of the comparative example.

Second Embodiment

The following describes a second embodiment. In the description of the second and subsequent embodiments, elements having the same reference numerals as those used so far are identical to the elements having the same reference numerals in the previous embodiment(s), unless otherwise specified. When only part of the configuration is described, the embodiment(s) described earlier may be applied to the other part of the configuration.

Figure 8:
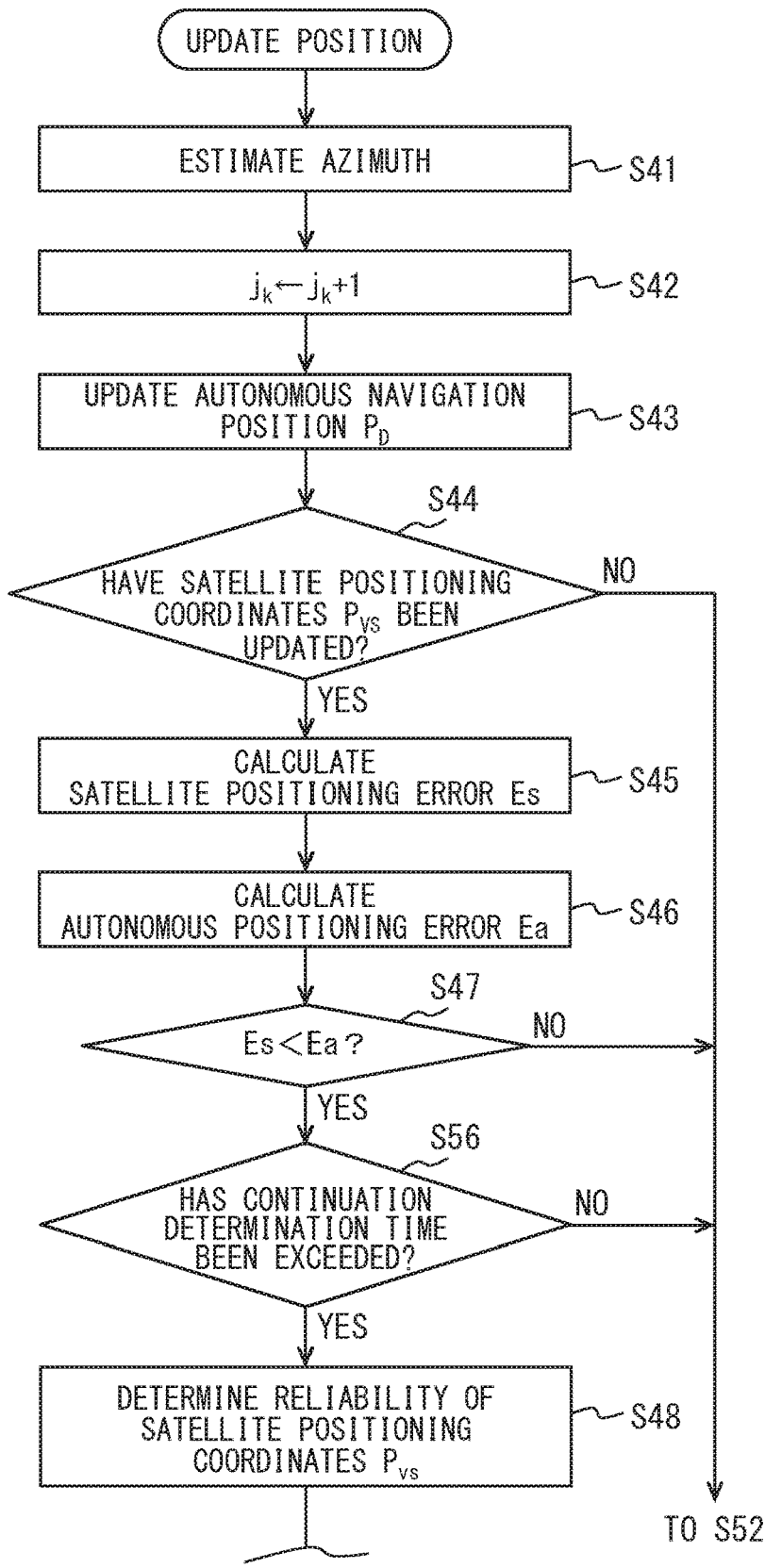
FIG. 8 is a flowchart showing processing executed instead of FIG. 6 in a second embodiment.

The second embodiment differs from the first embodiment in that processing in S56 shown in FIG. 8 is added as a function of the position calculation unit 108.

In the second embodiment, even if it is determined in determination in S47 that the satellite positioning error Es is smaller than the autonomous positioning error Ea, S48 and subsequent steps are not immediately executed, and determination in S56 is further performed.

In S56, it is determined whether a state in which the satellite positioning error Es is smaller than the autonomous positioning error Ea has continued for a time longer than a continuation determination time. The purpose of this determination is to take it into account that the satellite positioning error Es may be unstable immediately after satellite positioning becomes possible. The reason why the satellite positioning error Es may be unstable immediately after satellite positioning becomes possible is, for example, the following reason. Specifically, in a state where satellite positioning is impossible, the number of observable satellites may be small due to obstructions such as buildings, and immediately after the number of observable satellites increases, observation may become only temporarily possible due to multipath. Since the determination in S56 is performed for this purpose, the continuation determination time is a time for determining that satellite positioning is stable in a possible state after satellite positioning becomes possible. The continuation determination time is determined empirically based on measurement with actual equipment. The continuation determination time is set, for example, to 1 second.

If the determination in S56 is NO, the process proceeds to S52 as when the determination in S47 is NO. On the other hand, if the determination in S56 is YES, S48 and subsequent steps are executed to update the real reference point Br to the latest satellite positioning coordinates Pvs.

Figure 9:
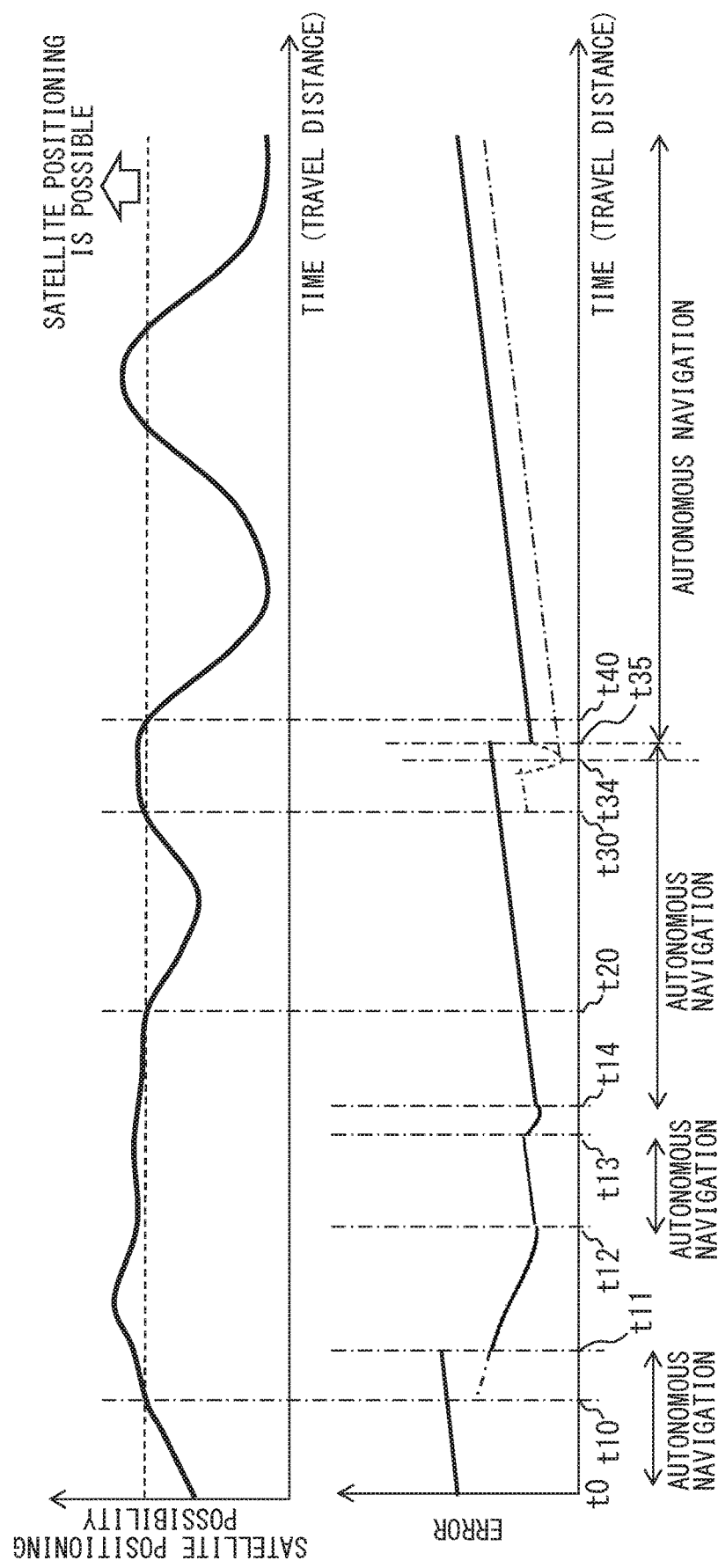
FIG. 9 is a diagram showing an example of variation in an error when the second embodiment is implemented.

FIG. 9 shows an example of error variation in the second embodiment. A lower graph of FIG. 9 corresponds to the lower graph of FIG. 7, where the horizontal axis represents time or travel distance, and the vertical axis represents error. An upper graph of FIG. 9 is identical to the upper graph of FIG. 7. In FIGS. 7 and 9, times marked with the same numerical value mean the same time. A dot-and-dash line in the lower graph of FIG. 9 represents the solid line in the lower graph of FIG. 7.

In FIG. 7, switching from autonomous navigation to satellite positioning is done at t10. However, in the second embodiment, autonomous navigation is continued until t11 at which the continuation determination time has elapsed since satellite positioning has become possible at t10.

In FIG. 7, temporary switching to satellite positioning is done between t30 and t31. However, the time between t30 and t31 is shorter than the continuation determination time, so that in the second embodiment, autonomous navigation is not terminated at t30. In FIG. 7, switching to satellite positioning is done at t32. In the second embodiment, autonomous navigation is continued until t35.

The autonomous positioning error Ea is calculated with reference to the satellite positioning error Es at the point in time when switching to autonomous navigation is done. Thus, in the first embodiment, as shown at t34, when the satellite positioning error Es becomes temporarily small, the autonomous positioning error Ea calculated after t34 becomes small. However, the satellite positioning error Es becomes small temporarily at t34, and the satellite positioning error Es is not in a stable state. This satellite positioning error Es has a small value, but its reliability is low. Consequently, the reliability of the autonomous positioning error Ea calculated after t34 is also low.

In the second embodiment, switching to satellite positioning is done when a state in which the satellite positioning error Es is lower than the autonomous positioning error Ea continues for a time longer than the continuation determination time. Thus, until t35, autonomous navigation is continued without switching to satellite positioning.

The error in the solid line at t35 in FIG. 9 is larger than the error at t35 in FIG. 7 that is also indicated by the dashed-dotted line for comparison in FIG. 9. However, it may be said that the error indicated by the solid line in FIG. 9 is more reliable in error value.

Third Embodiment

The third embodiment differs from the first embodiment in the method of calculating the satellite positioning error Es calculated in S45. In the first embodiment, the pseudorange residual is used as the satellite positioning error Es. On the other hand, in the third embodiment, a value obtained by additionally multiplying the pseudorange residual by a precision deterioration factor is used as the satellite positioning error Es.

The precision deterioration factor is a value determined based on at least one of the extent of variation of the pseudorange residual, the S/N of navigation signals, and Dilution Of Precision (DOP). DOP is also called a precision decrease rate. The extent of variation of the pseudorange residual may be expressed, for example, by the variance of the pseudorange residual.

The relationship between the extent of variation of the pseudorange residual, the S/N of navigation signals, and/or DOP, and the precision deterioration factor is set in advance. This relationship is, for example, a table in which the precision deterioration factor is determined from the extent of variation of the pseudorange residual, the S/N of navigation signals, and/or DOP.

The larger the extent of variation of the pseudorange residual is, the larger the positioning error by satellite navigation is. Also, the larger the S/N of navigation signals and/or DOP is, the larger the positioning error by satellite navigation is. Therefore, in the third embodiment, the precision deterioration factor is determined based on at least one of the extent of variation of the pseudorange residual, the S/N of navigation signals, and DOP, and a value obtained by multiplying the pseudorange residual by the precision deterioration factor is used as the satellite positioning error Es.

Figure 10:
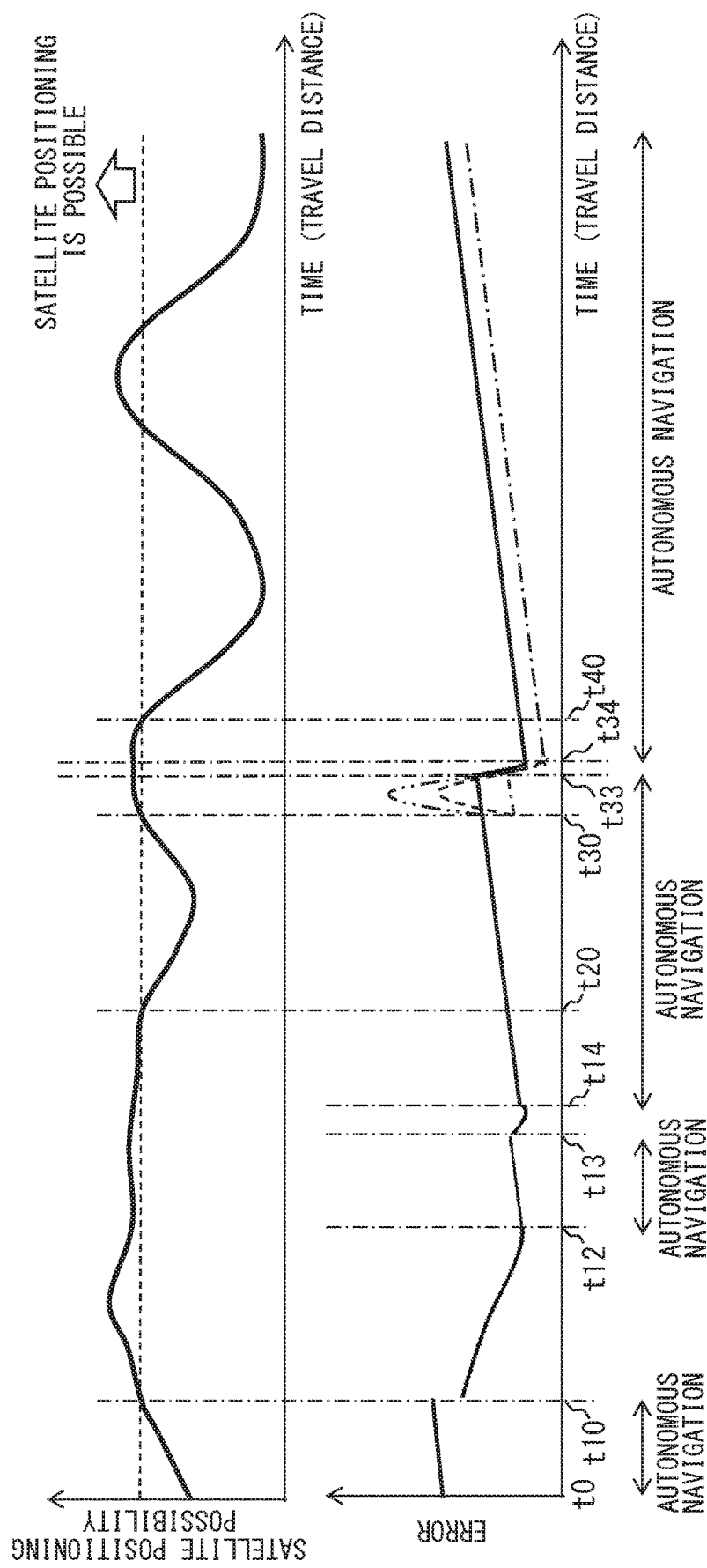
FIG. 10 is a diagram showing an example of variation in an error when a third embodiment is implemented.

FIG. 10 shows an example of error variation in the third embodiment. A lower graph of FIG. 10 corresponds to the lower graph of FIG. 7, where the horizontal axis represents time or travel distance, and the vertical axis represents error. An upper graph of FIG. 10 is identical to the upper graph of FIG. 7. In FIGS. 7 and 10, times marked with the same numerical value mean the same time. A dot-and-dash line in the lower graph of FIG. 10 represents the solid line in the lower graph of FIG. 7. A broken line in the lower graph of FIG. 10 represents the broken line in the lower graph of FIG. 7, i.e. the satellite positioning error Es in the first embodiment, and a dash-dot-dot line in the lower graph of FIG. 10 represents the satellite positioning error Es in the third embodiment.

The satellite positioning error Es of the third embodiment is a value obtained by multiplying the pseudorange residual by the precision deterioration factor. Therefore, as shown by the broken line and the dash-dot-dot line in FIG. 10, the satellite positioning error Es of the third embodiment (the dash-dot-dot line) is larger than the satellite positioning error Es of the first embodiment (the broken line) in which the pseudorange residual is directly used as the satellite positioning error Es.

In the third embodiment, autonomous navigation is more likely to be continued than in the first embodiment. Thus, autonomous navigation is continued until t33 in the third embodiment. Satellite positioning is performed from t33 to t34, and autonomous navigation is performed from t34. The satellite positioning error Es at t34 is larger than the satellite positioning error Es of the first embodiment, and thus the error of the third embodiment indicated by the solid line after t34 is larger than the error of the first embodiment indicated by the dashed-dotted line. However, it may be said that the error indicated by the solid line in FIG. 10 is more reliable in error value.

Although the embodiments have been described above, the disclosed technology is not limited to the above-described embodiments. The following modifications are also included in the disclosed scope. In addition to the following, various modifications may be made without departing from the gist.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

First Modification

Autonomous navigation may be performed without using the virtual reference point By. S48 to S52 in FIG. 6 are omitted. In S53, a movement trajectory after the latest satellite positioning coordinates Pvs are determined is determined. In S54, the latest satellite positioning coordinates Pvs are used as a reference point, and a position moved from the reference point by the movement trajectory is set as the current position P.

Second Modification

The position P of the vehicle 1 may be determined with quadratic coordinates. In this case, the pitch angle and the pitch rate become unnecessary.

The position of the vehicle 1 may be determined with a roll angle taken into account. A roll angle, a roll rate, and a roll rate correction value may be calculated in the same manner as for a yaw angle, a yaw rate, and a yaw rate correction value.

Third Modification

In the above-described embodiments, the moving object is a car. The moving object may be other than a car.

What is claimed is:

1. A positioning device comprising:
   a satellite positioning unit configured to acquire a position of a moving object determined by satellite navigation based on navigation signals received by a GNSS receiver;
   an autonomous positioning unit configured to
      estimate a movement trajectory of the moving object based on
         satellite information, which is determined according to the navigation signals received by the GNSS receiver and
         detection values of behavior detection sensors for detecting a behavior of the moving object, and
      estimate the position of the moving object based on a reference point and the movement trajectory of the moving object; and
   an error estimation unit configured to estimate a satellite positioning error as an error in the position of the moving object determined by the satellite positioning unit, and estimate an autonomous positioning error as an error in the position of the moving object estimated by the autonomous positioning unit,
   wherein the autonomous positioning unit is configured to set the position of the moving object acquired by the satellite positioning unit as the reference point, in response to that the satellite positioning error is smaller than the autonomous positioning error.

2. The positioning device according to claim 1, wherein the autonomous positioning unit is configured to set the position of the moving object acquired by the satellite positioning unit as the reference point, in response to that the satellite positioning error has been smaller than the autonomous positioning error for a time longer than a preset continuation determination time period.

3. The positioning device according to claim 1, further comprising:
   an azimuth estimation unit configured to estimate a movement azimuth of the moving object based on Doppler shift amounts of the navigation signals,
   wherein the autonomous positioning unit is configured to:
      estimate the movement trajectory of the moving object based on the movement azimuth of the moving object and a speed of the moving object; and
      acquire a detection value of a yaw rate sensor included in the behavior detection sensors,
   wherein, when the azimuth estimation unit estimates the movement azimuth of the moving object, the autonomous positioning unit estimates the movement trajectory of the moving object based on the movement azimuth of the moving object estimated by the azimuth estimation unit,
   wherein, when the azimuth estimation unit does not estimate the movement azimuth of the moving object, the autonomous positioning unit estimates an amount of azimuth angle change of the moving object based on the detection value of the yaw rate sensor, and determines the movement azimuth of the moving object based on the amount of azimuth angular change of the moving object and a past reference azimuth, and
   wherein, when the autonomous positioning unit estimates the movement trajectory of the moving object based on the movement azimuth of the moving object estimated by the azimuth estimation unit, the error estimation unit adjusts an amount of increase in the autonomous positioning error to be small as compared with a situation of the autonomous positioning unit determining the movement azimuth of the moving object based on the detection value of the yaw rate sensor.

4. The positioning device according to claim 1, wherein the error estimation unit is configured to calculate the satellite positioning error by multiplying a pseudorange residual by a precision deterioration factor, and wherein the precision deterioration factor is determined based on at least one of an extent of variation of the pseudorange residual, S/N of the navigation signals, or a precision decrease rate.

5. The positioning device according to claim 4, wherein the precision deterioration factor is determined based on the extent of variation of the pseudorange residual.

6. The positioning device according to claim 4, wherein the precision deterioration factor is determined based on the S/N of the navigation signals.

7. The positioning device according to claim 4, wherein the precision deterioration factor is determined based on the precision decrease rate.

8. A positioning device comprising:
   a computer configured to:
      acquire a position of a moving object determined by satellite navigation based on navigation signals received by a GNSS receiver;
      estimate a movement trajectory of the moving object based on satellite information, which is determined according to the navigation signals received by the GNSS receiver, and detection values of behavior detection sensors for detecting a behavior of the moving object;

estimate the position of the moving object based on a reference point and the movement trajectory of the moving object;

estimate a satellite positioning error as an error in the position of the moving object determined by the computer, and estimate an autonomous positioning error as an error in the position of the moving object estimated by the computer;

set the position of the moving object acquired by the computer as the reference point, in response to the satellite positioning error being smaller than the autonomous positioning error.

* * * * *